United States Patent

Cooper et al.

(10) Patent No.: US 6,736,314 B2
(45) Date of Patent: May 18, 2004

(54) METHODS AND SYSTEMS FOR TRANSFERRING FUNDS

(75) Inventors: Wayne P. Cooper, Charlotte, NC (US);
Patrick C. Brown, Charlotte, NC (US);
Clyde Dennis Jones, Cornelius, NC (US)

(73) Assignee: Telecom USA, Charlotte, NC (US)

( * ) Notice: Subject to any disclaimer, the term of this patent is extended or adjusted under 35 U.S.C. 154(b) by 88 days.

(21) Appl. No.: 09/877,533

(22) Filed: Jun. 8, 2001

(65) Prior Publication Data

US 2002/0185529 A1 Dec. 12, 2002

Related U.S. Application Data

(60) Provisional application No. 60/210,353, filed on Jun. 9, 2000.

(51) Int. Cl.[7] .......................... G06K 5/00; G06F 17/00; G06F 17/60
(52) U.S. Cl. .................. 235/380; 235/375; 235/379
(58) Field of Search ................. 235/375, 379, 235/380; 705/17, 39, 41

(56) References Cited

U.S. PATENT DOCUMENTS

| 4,408,203 | A | | 10/1983 | Campbell |
| 4,423,316 | A | | 12/1983 | Sano et al. |
| 4,988,849 | A | | 1/1991 | Sasaki et al. |
| 5,122,950 | A | | 6/1992 | Benton et al. |
| 5,265,008 | A | | 11/1993 | Benton et al. |
| 5,283,829 | A | | 2/1994 | Anderson |
| 5,326,960 | A | | 7/1994 | Tannenbaum |
| 5,343,529 | A | | 8/1994 | Goldfine et al. |
| 5,350,906 | A | | 9/1994 | Brody et al. |
| 5,371,797 | A | | 12/1994 | Bocinsky, Jr. |
| 5,448,043 | A | * | 9/1995 | Nakano et al. ............. 235/379 |
| 5,455,407 | A | | 10/1995 | Rosen |
| 5,457,305 | A | | 10/1995 | Akel et al. |
| 5,461,217 | A | | 10/1995 | Claus |
| 5,465,206 | A | | 11/1995 | Hilt et al. |
| 5,650,604 | A | | 7/1997 | Marcous et al. |
| 5,659,165 | A | | 8/1997 | Jennings et al. |
| 5,825,003 | A | | 10/1998 | Jennings et al. |
| 5,937,396 | A | * | 8/1999 | Konya ..................... 705/43 |
| 5,963,647 | A | * | 10/1999 | Downing et al. ............ 705/39 |
| 6,012,048 | A | | 1/2000 | Gustin et al. |
| 2002/0195486 | A1 | * | 12/2002 | Erb et al. .................. 235/379 |

OTHER PUBLICATIONS

Rapid Money; Various pages from www.rapidmoney.com with a total of 9 pages.
Western Union Application with a total of 3 pages.

* cited by examiner

Primary Examiner—Karl D. Frech
Assistant Examiner—April Nowlin
(74) Attorney, Agent, or Firm—Alston & Bird LLP

(57) ABSTRACT

Methods and systems for transferring funds are disclosed that utilize a transfer card issued to a sender that enables the sender to transfer funds at independent host locations. The transfer card is encoded with information about the sender and the intended receiver so that transfer forms are not required for each transaction. The receiver obtains the funds via a distribution center, wherein the personal identity of the receiver is verified before the funds are distributed.

34 Claims, 4 Drawing Sheets

US 6,736,314 B2

METHODS AND SYSTEMS FOR TRANSFERRING FUNDS

CROSS-REFERENCE TO RELATED APPLICATIONS

This application claims the benefit of U.S. Provisional Application No. 60/210,353, filed Jun. 9, 2000, entitled "Methods And Systems For Transferring Funds."

FIELD OF THE INVENTION

The present invention is generally directed to the electronic transfer of funds and, more particularly, directed to methods and systems for transferring funds using an existing independent or third party host system to effect the funds transfer.

BACKGROUND OF THE INVENTION

The concept of transferring funds or "wiring money" has been practiced for over a century. At today's speed of society, there is a greater and greater need for transferring funds rapidly from one individual to another. Wiring money is particularly useful for individuals that are known as "unbanked," which means unaffiliated with a financial institution. Migrant workers or foreign nationals, for example, are often unbanked and frequently use wire transfers to send money to other states or other countries for a variety of reasons. For example, these individuals rely on money transfers to help support their families or provide medical or other expenses to those located elsewhere. There are several conventional methods of transferring or wiring money, the most common being a transfer service by Western Union®.

To send money via Western Union®, a customer must travel to a Western Union® office or agent location and present cash or equivalent funds in the amount to be transferred plus a service fee. The sender is required to fill out a detailed transfer request form for each transaction, which is then automatically or manually entered into the Western Union® system. This is a very labored-intensive and time-consuming operation, particularly if the sender makes frequent transfers.

Another system of transferring funds allows customers of a particular financial institution to transfer and receive funds between other account holders electronically. However, this system requires that the individuals have accounts at the financial institution or affiliated institutions, and therefore ignores the large number of unbanked customers that wish to transfer funds.

Yet another system of transferring funds is disclosed in U.S. Pat. No. 5,650,604, which discloses a system and method for transferring funds using automated teller machines ("ATM") such that the identity of the sender and recipient can be maintained in secret. While the system and methods disclosed in the '604 patent provide convenience to those individuals who wish to keep their identities private, the '604 patent is disadvantageous in at least two respects. First, the '604 patent goes too far in trying to maintain the confidentiality and privacy of the sender and recipient. In particular, neither the sender nor recipient is required to disclose any personal information for identification purposes. Thus, if transfer information such as a transaction code or personal identification number (PIN) is intercepted, the transferred funds could be easily stolen. Second, the '604 patent discloses a closed system for transferring funds, which is less convenient for the sender because the sender must locate or access the system of the '604 patent as a separate and distinct operation. Therefore, it is desirable to provide a system and method of transferring funds that is more convenient to the sender and recipient, yet provide security measures in order to prevent theft or interception of the transferred funds.

SUMMARY OF THE INVENTION

In view of the above problems associated with conventional systems and methods, the present invention provides methods and systems for transferring funds that provide convenient accessibility for the sender while also providing a high level of security on the distribution end of the transaction. Advantageously, the system and methods of the present invention utilize an existing third party host system, such as a conventional checkout system at a hardware store or grocery store, so that the sender can transfer funds in conjunction with the purchase of unrelated goods and/or services. The system includes a transfer card that is encoded with, according to one embodiment, personal information about the sender and recipient so that this information need only be entered before the first transaction and is thereafter stored permanently by the transfer card. The transfer card is readable by a device of the independent or third party host system, such as a bar code scanner or a magnetic stripe reader, and money to be sent to the receiver is collected by the independent host system along with the money that purchases the unrelated goods and/or services. Thus, the sender is not required to seek out an ATM or stand-alone device when desiring to transfer funds, and compared to conventional systems and methods, the funds transfer of the present invention is performed more quickly and conveniently.

More specifically, a method of transferring funds according to one embodiment of the present invention comprises sending a transfer request from an independent host system to a central processing center, wherein the transfer request includes transfer information, such as personal information of the sender and/or receiver as well as an amount to be transferred. The central processing center responds with a status response, which indicates whether the transfer may proceed. If the transfer proceeds, cash is preferably received by the independent host and the funds are made available for transfer to the receiver. A transaction code is generated by the central processing center and provided to the sender, who in turn communicates the code to the receiver. The receiver obtains the transferred funds by presenting transfer information and personal identification to a distribution center. The distribution center receives the transfer information and personal identification of the receiver and compares this information with the transfer information received from the sender. If the information matches, the central processing center sends an authorization to the distribution center to distribute the funds to the receiver.

The transfer request preferably utilizes existing point-of-sale devices at the independent host system, such as a conventional checkout system employing bar code scanners and magnetic stripe (credit card) readers. In this regard, the present invention includes a transfer card having, according to one embodiment, a bar code and a magnetic stripe that includes information at least about the sender, and preferably includes information about the receiver as well. Thus, the transfer card can be used for an endless number of transfers, which speeds transactions and lowers costs.

The receiver preferably is required to present some kind of personal information to the distribution center, such as by showing a drivers license or picture identification to a teller or other personnel of the bank. The transaction code is also presented by the receiver, and the code and personal identity of the receiver are confirmed. This can be done by the central processing center or by the distribution center, and preferably the personal identity of the receiver is verified by the distribution center while the transaction code is confirmed at least by the central processing center.

For unbanked and banked consumers, the ability to transfer funds to people in remote locations while shopping and purchasing items at independent retail locations is a great advance in the art of transferring funds in terms of convenience and customer satisfaction. The systems and methods of the present invention provide more convenience to the sender by utilizing existing third party host locations and eliminating repetitive transfer forms. In addition, the systems and methods of the present invention provide security and convenience on the receiving end of the transfer, which provides more peace of mind to the sender and receiver.

BRIEF DESCRIPTION OF THE DRAWINGS

Figure 1:
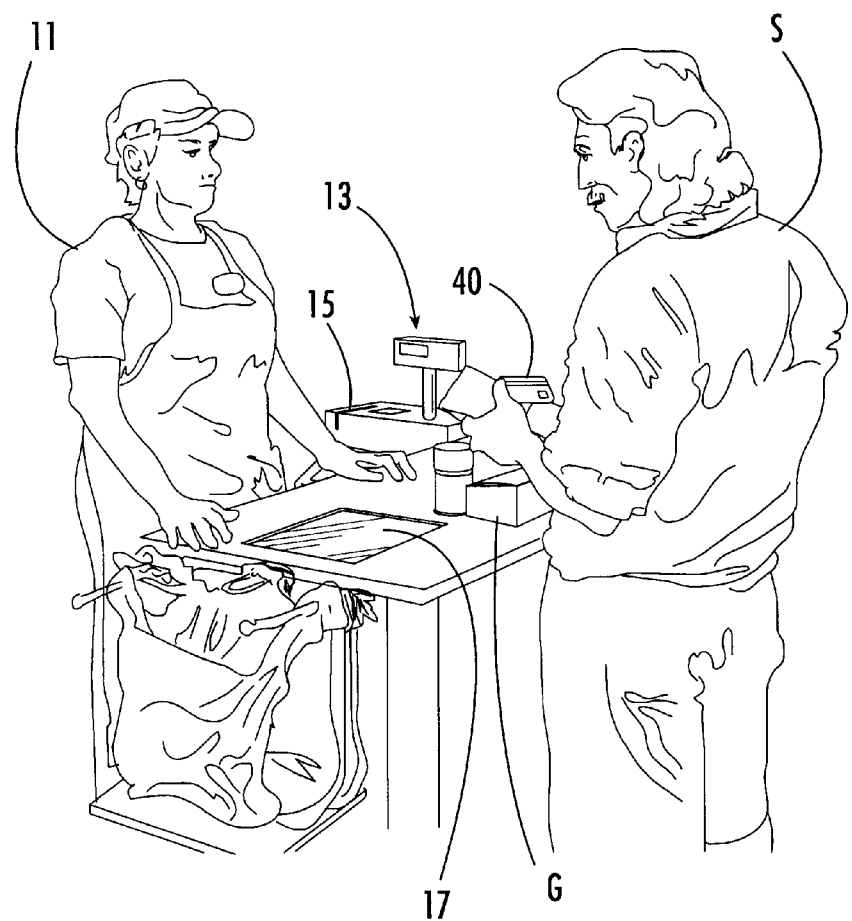
Figure 2:
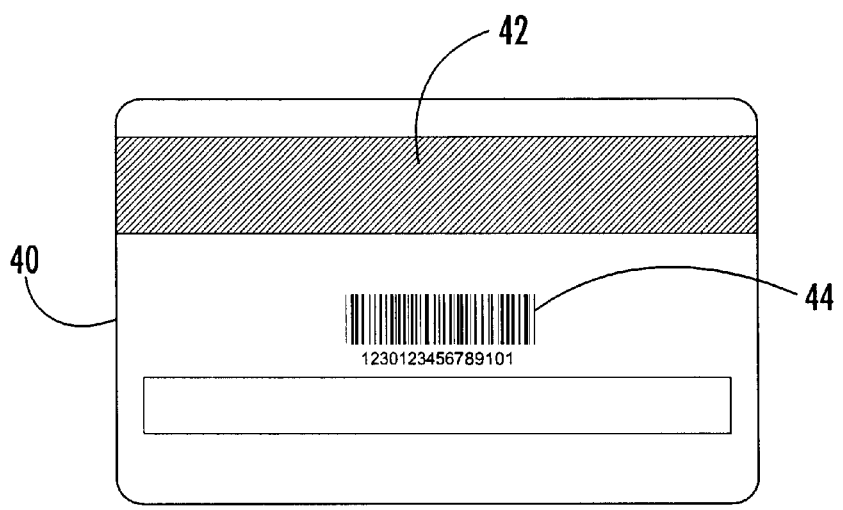
Figure 3:
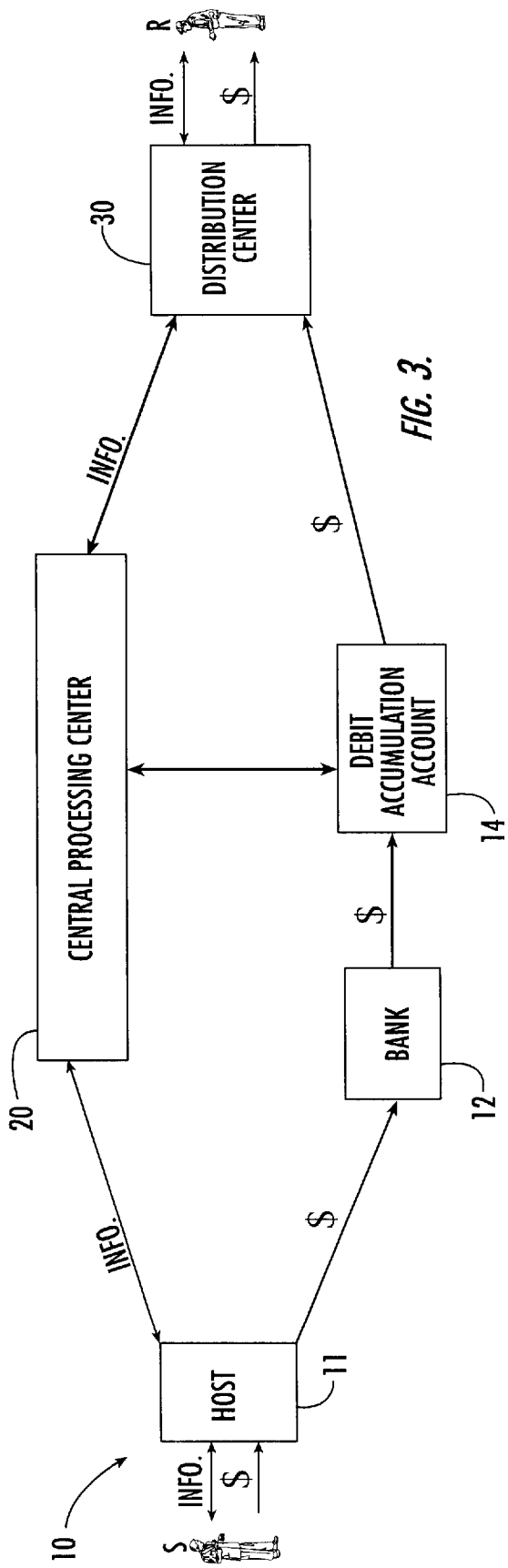
Figure 4:
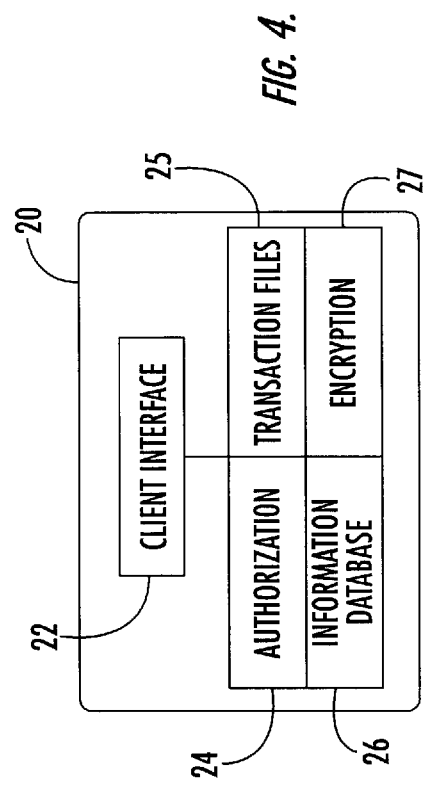
Figure 5:
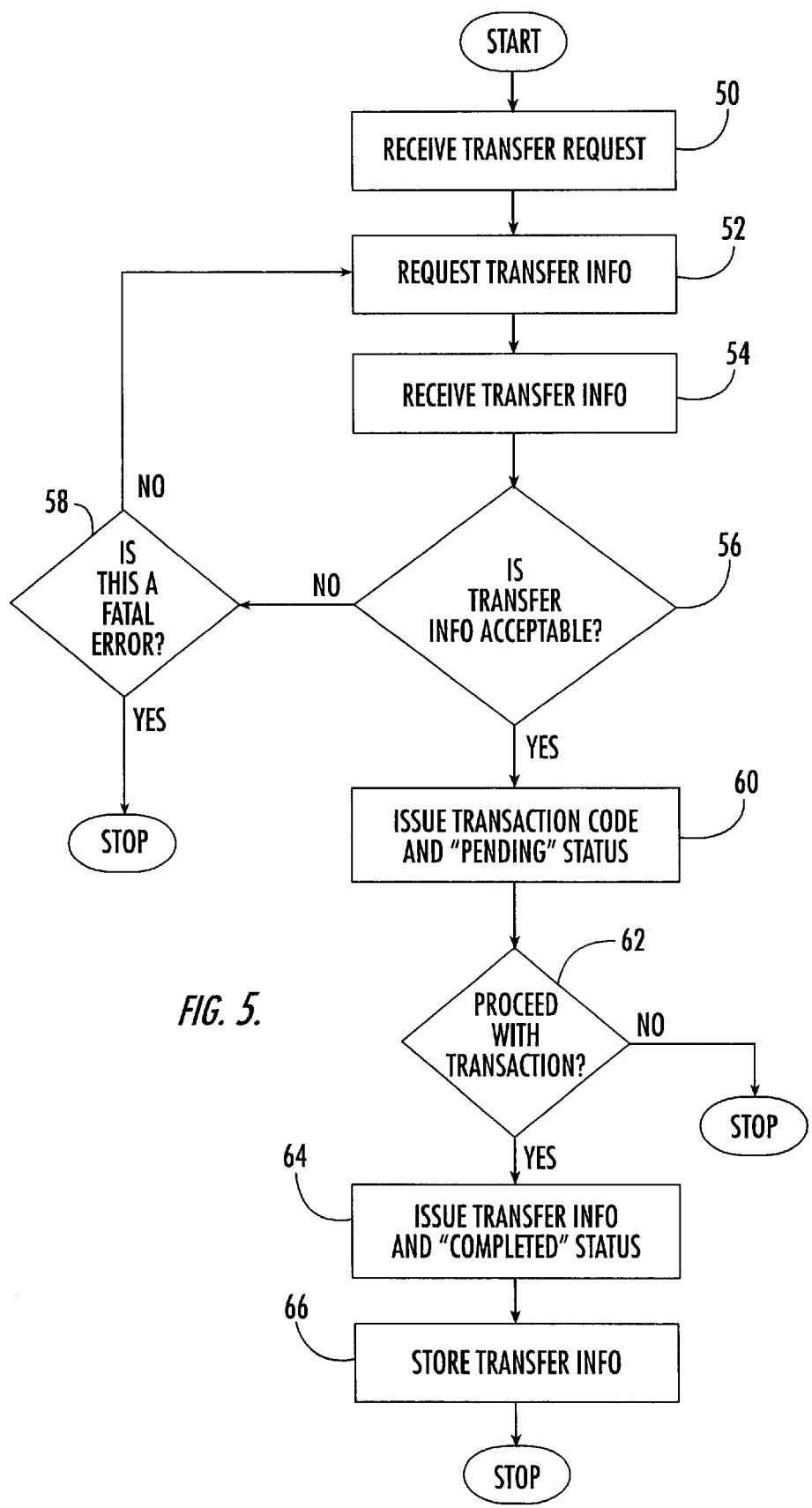
Figure 6:
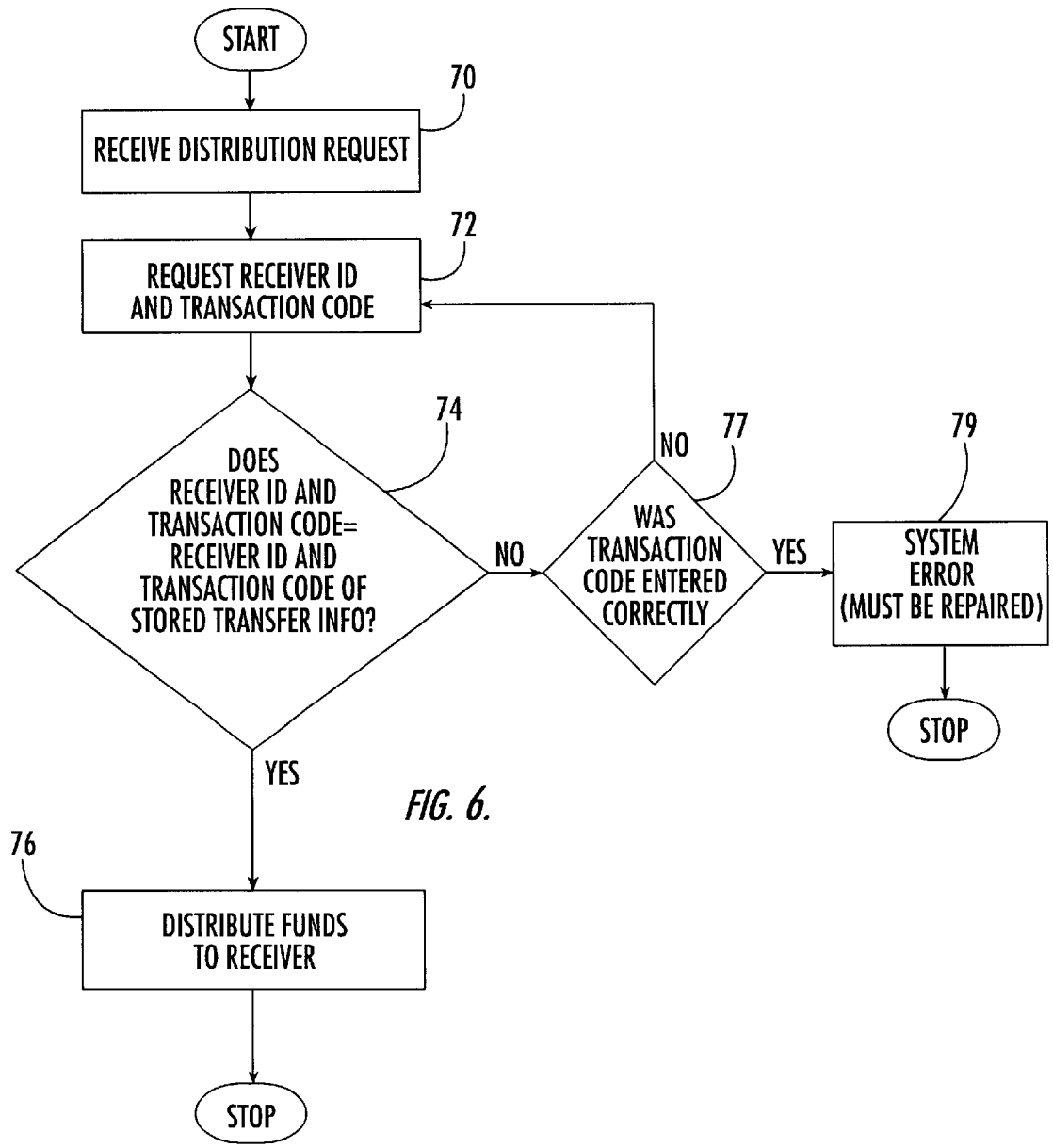

Having thus described the invention in general terms, reference will now be made to the accompanying drawings, which are not necessarily drawn to scale, and wherein:

FIG. 1 is an environmental view of a funds transfer being initiated according to one embodiment of the present invention;

FIG. 2 is a side view of a transfer card according to one embodiment of the present invention;

FIG. 3 is a schematic illustration of a network illustrating one embodiment of the present invention;

FIG. 4 is a schematic illustration of a central processing center according to one embodiment of the present invention;

FIG. 5 is a block diagram illustrating the initiating portion of a transaction according to one embodiment of the present invention; and FIG. 6 is a block diagram illustrating the receiving portion of a transaction according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is directed to a system and methods for transferring funds from individual to individual. According to embodiments shown in FIGS. 1–4, the system 10 is directed toward individuals who wish to transfer funds quickly and easily by utilizing pre-existing hardware at convenient independent, third-party host locations 11. In other words, the system 10 is integrated advantageously with existing technology already present at the host locations 11. These independent host locations 11, such as retail points-of-sale like grocery stores, hardware stores, and auto parts stores, utilize several conventional methods for allowing customers to purchase goods and services in the normal course of commerce. These conventional methods include bar code readers and credit card style magnetic stripe readers, as discussed more fully below. In particular, FIG. 1 shows an example of a sender S initiating a funds transfer according to the present invention. As shown, the sender S is in the process of purchasing unrelated goods G or services, and desires to transfer funds to an individual at a remote location. The host 11 could also be a bank or other financial institution, gas station, restaurant, or other business employing conventional checkout technology.

As stated above, the system 10 of the present invention "piggybacks" or ties directly onto hardware that is already available at the host location 11. Therefore, no additional hardware need be supplied to or maintained by the host 11, which greatly reduces the cost and maintenance of the system 10 and also the cost of each transaction. And because the host system is preferably connected to a network, such as the Internet or the like, the system software can be installed at the host location 11 and be updated and upgraded from a remote location.

Advantageously, the system of the present invention includes a transfer card 40 that enables the sender S to initiate a transfer using the independent host system 11. The transfer card 40 is associated with information at least about the sender S and, in one embodiment, also with information about a receiver R. Before the first transfer, the sender S is required to fill out a registration form, which in one embodiment is bilingual, that provides personal identifying information. In a preferred embodiment, the registration form includes personal information identifying the sender S and receiver R. The personal information is assigned to the transfer card 40, which preferably is pre-encoded with a 16-digit code, such that the personal information is associated with the code encoded on the transfer card. The card is then provided to the sender S. For example, agents, such as grocery store employees, bank tellers, or the like, can receive the form, assign the information to the transfer card, and provide the transfer card to the sender S, although this could be done automatically by machine. In one embodiment, the identifying information includes the name and address of the sender S and the receiver R, and may include other information such as telephone number, physical description, secret word, and the like. Thus, the transfer card 40 enables the funds transfer of the present invention to be somewhat "self-service" in that the involvement of the cashier or host attendant at the point-of-sale is reduced. Less attendant involvement is also less intimidating for the sender S, particularly if language or cultural barriers are present.

Thus, while the sender S is required to initially fill out the registration form, the identifying information is thereafter assigned to the transfer card 40 such that this information need not be entered again for subsequent transactions. Because it is believed that most transfers are directed to a single receiver R, this feature provides an extra amount of security in determining who is able to receive the funds, while adding more convenience to the sender S by not requiring this information to be filled out each time a transaction is desired. If multiple receivers are desired, it is of course possible to have a separate transfer card for each receiver in order to maintain the security of each transaction.

As shown in FIG. 2, the transfer card 40 preferably includes a magnetic stripe 42 and a universal product code (UPC) or Code-128 bar code 44 that is readable by a point-of-sale device of the checkout system 13. For example, a magnetic stripe (credit card) reader 15 could be employed to read the magnetic stripe of the transfer card 40, and/or a bar code reader 17 could be used to read the bar code 44 of the transfer card. As mentioned above, these items are present in conventional retail points-of-sale systems, and are easily programmable to accept the transfer card 40 of the present invention. In one embodiment, transfers appear as an SKU or line item on the sender's receipt along with the other purchased goods and/or services. In case the magnetic strips 42 or bar code 44 are not readable, the 16-digit code described above is also provided on the transfer card 40 so that the transfer information can be entered manually.

Turning now to FIGS. 3–6, the system 10 according to one embodiment of the present invention is shown schematically to illustrate how funds are transferred from the sender S to the receiver R. As shown in FIGS. 1, 3, and 5, the sender S initiates the transfer via the host 11 by utilizing the transfer card 40. The sender S or agent (e.g., cashier, teller, or the like) of the host 11 presents the transfer card to the appropriate card reader device, which scans or reads the card. The sender S then tells the host that the sender wishes to send a specific amount of money, e.g., five hundred dollars (US $500.00). The host collects the specific amount of money for the transfer plus, if applicable, the money for the other purchased goods and/or a service fee. The host then initiates the transfer of $500 by entering this amount into a terminal and indicating that the transfer should proceed. According to one embodiment, the transfer amount (plus transaction or service fee, if any) is debited from the host 11 and the transfer amount is available for transfer to the receiver R. For speed and convenience, the debiting step typically occurs sometime after the funds are made available for transfer, as discussed more fully below. In addition, a receipt (not shown) is printed for the sender S that preferably includes the transfer amount and, among other items, a toll-free number so the sender S can obtain the status of the transaction or receive other customer service.

More specifically, a new transaction is initiated when the host 11 scans or reads the transfer card 40 presented by the sender S. The request 50 is transferred through the host system 11 and to the central processing center 20 by sending a URL to a secure ASP of the system 10. An example of the request format is:

http://servername/asppagename.asp?/action code/account/hostID/amount to transfer The terms in this example are defined as follows: the server name and ASP page comprise part of a secure internet address associated with the central processing center 20. The action code is preferably 1, 2, or 3, wherein 1 represents "begin a new transaction;" 2 represents "complete the transaction;" and 3 represents "cancel the transaction." The account is a 16-digit identifier associated with the sender S that is encoded on the transfer card 40 used in the transaction. The host ID is a unique identifier assigned to each host 11 associated with the system 10. The amount to transfer is preferably the principal amount to transfer in US dollars that is received from the sender S.

When the central processing center 20 receives the request from the host 11, the central processing center 20 determines 52, 54, 56, 58 whether the transfer may proceed based on information stored therein and if any errors are present in the transfer information. If the transfer information is acceptable, the central processing center replies with a comma-delimited string 60 that includes a transaction code, status code, amount to transfer in one or more currencies, and a toll-free customer service number. The initial status code sent from the central processing center 20 signifies that the transfer is "pending." To complete the transaction, the host 11 contacts the central processing center 62, 64 as described above, except that the action code mentioned above is set to 2. Preferably, the transfer will not be completed until a request to complete the transaction is sent from the host 11. The transfer info is then stored 66 by the central processing center 20.

In one embodiment, funds settlement is handled via Automated Clearing House (ACH). In particular, the cash related to the funds transfer is collected by the host 11 and transferred to a bank 12 or other financial institution, such as by conventional nightly deposits. The bank 12 includes or is connected to a debit accumulation account 14, which is also operably connected to the central processing center 20 via conventional techniques. The ACH includes a processor (not shown) that debits the transferred funds from the host's account for the transactions that have taken place during a predetermined time period and credits the debit accumulation account 14. The system 10 will also subtract any service or transaction fees, if applicable.

More specifically, the ACH processor totals the transactions for each host 11 linked to the system 10. This total preferably includes the amounts to be transferred plus service fees. For example, if Host A performs three transactions of $300, $350, and $200, and a service fee of $3 applies to each transaction, then the total debited from Host A's account will be $850+$9, or $859. The system 10 then subtracts or retains the $9 in fees and makes $850 available for transfer to the receiver R.

The system 10 also includes a distribution center 30 that is operably connected to both the central processing center 20 and the debit accumulation account 14 such that information pertaining to the funds transfer, as well as the sender S and receiver R, can be transferred to and from the host 11, the central processing center 20, and the distribution center 30 to effect the funds transfer. As mentioned above, the distribution center 30 is preferably a bank or other financial institution in order to provide a sense of security to the receiver R, as well as to maintain enough cash on hand to carry out many funds transfer transactions. The distribution center 30 can also be retail locations as well, such as pharmacies or consumer products stores. The distribution center 30 is preferably located in a convenient location, such as in a convenience store, grocery store, post office, mall, and the like, and may be one of a plurality of distribution centers, each of which being capable of transferring funds to the receiver R. In addition, the distribution center 30 can be located in a remote location, including other towns, states, or countries than the other components of the system 10. Among other functions discussed in detail below, the central processing center 20 is able to determine what currency is required at the distribution end of the transfer if information about the receiver R is known. Thus, the central processing center 20 is able to convert currencies, for example from US Dollars to Mexican Pesos. This conversion, if performed, is noted on the receipt given to the sender S at the conclusion of the initiating portion of the funds transfer.

As discussed more fully below, the receiver R is required to present some sort of personal identification to personnel of the distribution center, such as a picture ID, in order to receive the transferred funds. Therefore, the distribution center 30 preferably includes employees, such as bank tellers and the like, such that the personal identification of the receiver R can be verified by the personnel of the distribution center 30. Other ways are possible to verify the personal identity of the receiver R, such as fingerprint technology, retinal scanning, and the like.

FIG. 4 shows a more detailed view of the central processing center 20. In one embodiment, the central processing center 20 is a computer server and includes a client interface 22 that interacts with the host 11 and distribution center 30 to effect the funds transfer. The central processing center 20 also includes an authorization component 24, transaction files 25, an information database 26, and an encryption component 27. Other components of the central processing center 20 may also be included. The components of the central processing center 20 process and store all transactions passing therethrough for a complete audit trail of the transactions. For example, a "transaction" according to the present invention can be a change to the information database 26 or a transfer of funds. Where the distribution center 30 is a bank or financial institution, the transactions recorded and stored by the central processing center 20 can be verified by identifying parallel deposits at the distribution center.

The central processing center 20 stores the amount of money to be distributed in the transaction files 25 for later matching activity during the distribution portion of the funds transfer according to the present invention. The transaction files 25 are preferably online and any particular transaction is stored therein by information including personal information regarding the seller, the transaction code, the principal amount of the transfer, and personal information about the receiver R. The transaction files 25 are preferably holding files that are monitored for a length of time while waiting for the distribution process of the transaction to complete. If the distribution process of the transaction never completes or a predetermined time elapses, the convenience charge or fee, if any, is kept and the sender S and/or the receiver R is notified that the predetermined time has elapsed. In one embodiment, the amount available for transfer is returned to the sender S, such as by issuing a credit, mailing a check, or having the sender return to the host for a refund.

Each transaction record according to one embodiment is a series of characters that provide information regarding a particular transaction. For example, a sample transaction record may be presented as follows:

1230123456789101,1-23,2335.00, Pesos,250.00, US$, 8568442D,2930398

In this example, 1230123456789101 is a 16-digit code that is pre-encoded on the transfer card 40 used in the transaction and is assigned to the sender S; 1–23 refers to the host 11 where the transfer originates; 2335.00 refers to the amount of money to be transferred to the receiver; Pesos refers to the type of currency to be transferred to the receiver; 250.00 refers to the amount of money received by the host; US$ refers to the type of currency received by the host; 8568442D refers to a confirmation number generated by the central processing center 20; and 2930398 refers to the above-mentioned transaction code generated by the central processing center that preferably is received by the distribution center 30 from the receiver R before the funds are distributed.

The encryption component 27 provides a high level of security to data transfers between the various parts of the system 10. In particular, the data transfers in one embodiment have 128-bit encryption codes for every packet of information, and the data transfers are performed over direct dial or Internet-based Virtual Private Networks (VPN) communication links. Furthermore, the encrypted data packets contain a combination of identifiers, such as destination and origin identifiers, transmission date and time, and financial institution or banking instructions. For example, a batch record for each host 11 contains this information in a 90–100 character record that is transmitted daily to the central processing center 20 and related financial institution(s) for processing.

The central processing center 20 is also capable of monitoring all transactions through the system 10 pursuant to prevailing state and federal laws, rules, and regulations, including the Bank Secrecy Act and the Electronic Fund Transfer Act, as well as any revisions or additions to those laws as they occur. In order to discourage illegal activity and to maintain efficiency, the system 10 according to one embodiment include predetermined guidelines so that a sender is not permitted to transfer more than a specified amount in any single transaction, and is prohibited from making multiple transfers exceeding a predetermined maximum amount. Warning signs or "red flags" can also be established that indicate suspicious behavior. These warning signs include an extraordinary number of transfers that collectively do not meet the maximum transfer limit, or if a specific receiver receives more than the predetermined maximum amount whether from one or a plurality of senders.

FIG. 6 shows a block diagram describing the distribution end of the funds transfer according to one embodiment of the present invention. In particular, a distribution request 70 is received by the distribution center 30 when the receiver R contacts the distribution center 20, which is preferably performed by the receiver entering the distribution center and requesting the transferred funds from personnel of the distribution center. As discussed above, the central processing center 20 maintains transaction files 25 bearing a list of all electronic transfer transactions that have the initiating portions completed. The information sent from the distribution center is used by the central processing center 20 to determine which transaction is being considered and whether there is a match with the information stored in the transaction files 25.

The central processing center 20 activates the authorization component 24 to determine whether the request from the distribution center is matched to a transaction stored in transaction files 25, and whether the receiver is entitled to receive the specified funds. The authorization in component 24 compares the information communicated by the receiver R, including the transaction code, as well as other information stored in the transaction files 25 and information database 26. Preferably, personnel of the distribution center requests 72 personal identification of the receiver as well as the transaction code that was issued by the central processing center 20 to the sender S and is stored by the central processing center. In this regard, the sender S can relay the transaction code to the receiver R by a variety of means, including written, spoken, or electronically. The personnel of the distribution center 30 confirms 74 the personal identification of the receiver R and the transaction code so that the risk of a fraudulent distribution of the transferred funds is minimized or eliminated. In other words, the personal identity confirmation step is performed so that a fraudulent receiver with only the transaction code cannot receive the transferred funds. While the central processing center 20 is also capable of verifying or confirming the transaction code offered by the receiver, it is preferred that the personnel of the distribution center 30 perform the confirmation of the receiver's personal identity in order to ensure accuracy and reduce fraud.

Assuming the transaction code and/or the identity of the receiver are not matched with the information stored in the central processing center 20, the central processing center transmits a message directing the distribution center 30 to confirm the information 77. The cycle may be repeated as many times as desired, but is preferably limited to a specified number in order to discourage fraud and for efficiency purposes. If the information associated with the transfer card 40 was entered correctly yet still does not match the information stored by the central processing center 20, a system error exists 79 that must be repaired before the transfer is allowed to proceed. For example, if the name of the receiver R stored by the central processing center is listed as "H. R. Vasquez" and the receiver presents personal identification that lists "Hernan Rafael Vasquez," the information that is associated with the transfer card should be changed so that it preferably matches exactly that of the identification presented by the receiver. Of course, software or other tools may be employed that allow the transaction to proceed if the personal identification of the receiver matches that stored by the central processing center to a certain degree less than matching exactly.

Once the personal identification of the receiver R and the transaction code are verified, the central processing center sends an authorization signal to the distribution center to distribute the transferred funds 76 to the receiver R. Because the signals indicating funds being transferred from the sender S to the receiver R happen almost instantaneously, it is clear that the physical movement of cash from the sender to the bank 12 and distribution center 30 occurs much slower. In this regard, the sender S is almost instantaneously able to transfer money to the receiver R even though the physical transfer of cash to the distribution center 30 may take several days or longer. Thus, the distribution center 30 essentially "fronts" funds to the receiver R based on the transfer information from the central processing center 20, and waits to be reimbursed from the account of the host 11. In other words, once the present system 10 has received the authorization approval message 76, the relevant financial institution, such as the bank 12, commits to reimburse the distribution center 30 that will, in effect, be advancing funds on the sender's behalf when it distributes cash to the receiver R. Thus, the authorization approval is a guarantee on the part of the bank 12 that the distribution center 30 will be reimbursed. For this reason, the system 10 according to the present invention can complete the overall transaction in advance of actually getting the funds from the bank 12 as described above. It is possible to speed the transfer of cash from the host 11 to the bank 12, but the slight delay in reimbursing the distribution center 30 is typically small enough so that the distribution center is not in danger of running out of cash. And because the distribution center is preferably a bank or other financial institution, the distribution center is unlikely to run out of cash regardless of the number of transfers passing therethrough.

It should be understood by those skilled in the art that the central processing center 20 of the present invention can be accessed from any number of host systems 11 having their own hardware and software for reading the transfer card 40 and transmitting information contained thereon to the central processing center 20. Therefore, the particular host system 11 used in a transaction can be at a grocery store, hardware store, or other retail location or agent that is capable of reading the transfer card 40, receiving the funds transferred from the sender S, and transmitting the transaction information to the central processing center 20 while depositing the cash received from the sender with a bank or the like. The host systems 11 can be regional or national systems or networks that can be linked in a variety of arrangements to the central processing center 20. It will also be realized by those skilled in the art that these networks or systems may be international to the location of the central processing center 20. This feature of the present invention allows a sender S to place money in the receiver's hands in a matter of moments even if the receiver or the sender is travelling or working in other countries.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the host system 11 could be an employer instead of a retail point-of-sale. This embodiment is particularly advantageous for employers who employ a large number of foreign nationals or out-of-state workers. The initiating portion of the transfer is different in that the employer makes a predetermined amount of money available for transfer on behalf of the employee sender, but the remainder of the system and transfer method remains substantially the same. Although specific terms are employed herein, they are used in a generic and descriptive sense only and not for purposes of limitation.

That which is claimed:

1. A method of electronically transferring funds, the method comprising:

sending a transfer request that includes transfer information associated with personal information and including an amount to be transferred from an independent host system to a central processing center;

sending a status response from the central processing center to the independent host system;

receiving transfer information and personal identification from a receiver at a distribution center;

comparing for confirmation purposes the transfer information sent from the independent host system and the transfer information received from the receiver;

sending an authorization from the central processing center to the distribution center to distribute cash in accordance with the transfer request; and distributing funds from the distribution center to the receiver.

2. The method according to claim 1, wherein the transfer request sending step includes swiping a magnetic stripe from a transfer card identifying the sender.

3. The method according to claim 1, wherein the transfer request sending step includes swiping a magnetic stripe from a transfer card identifying a sender and the receiver.

4. The method according to claim 1, wherein the transfer request sending step includes scanning a bar code from a transfer card identifying a sender.

5. The method according to claim 1, wherein the transfer request sending step includes scanning a bar code from a transfer card identifying a sender and the receiver.

6. The method according to claim 1, wherein the status response sending step includes sending a pending status response and waiting for either a request for completion or a request for cancellation from the independent host system.

7. The method according to claim 1, further comprising transferring cash from a sender to the independent host system that includes an amount to be transferred to the receiver and a transaction fee.

8. The method according to claim 1, further comprising debiting an account of the independent host system an amount equal to at least the amount to be transferred to the receiver.

9. The method according to claim 1, wherein the transfer information and personal identification receiving step includes receiving picture identification from the receiver that matches the personal information sent from the independent host system to the central processing center.

10. The method according to claim 1, wherein the status response sending step includes sending a transaction code corresponding to the transfer request.

11. The method according to claim 1, wherein the transfer request sending step includes transferring cash from a sender to the independent host system in conjunction with a purchase of unrelated goods and/or services.

12. A method according to claim 1, wherein at least part of the transfer information comparing step is performed by personnel of the distribution center.

13. A method of electronically transferring funds from a sender to a receiver by way of an independent host system, the method comprising:

sending a transfer request from the sender to the independent host system via a source that personally identifies the sender, the transfer request comprising transfer information that at least indicates a monetary amount to be received by the receiver;

sending a status response from a central processing center to the independent host system that at least indicates that funds may be transferred by the sender to the receiver;

receiving at a distribution center personal information of the receiver and transfer information corresponding with the transfer information sent from the sender;

confirming the transfer information and personal identity of the receiver;

sending an authorization indicating that the monetary amount can be received by the receiver; and distributing funds from the distribution center to the receiver.

14. The method according to claim 13, wherein the transfer request sending step includes associating personal identification of the sender from a magnetic stripe on a transfer card.

15. The method according to claim 13, wherein the transfer request sending step includes receiving the request from the sender via a source that personally identifies the sender and the receiver.

16. The method according to claim 13, wherein the transfer request sending step includes associating personal identification of the sender from a bar code on a transfer card.

17. The method according to claim 13, further comprising transferring cash to personnel of the independent host system in an amount that includes a cash amount to be received by the receiver and a transaction fee.

18. The method according to claim 13, wherein the status response sending step includes sending a transaction code to the independent host system that must be received from the receiver and confirmed before distributing funds from the distribution center to the receiver.

19. The method according to claim 13, wherein the transfer information receiving step includes receiving the transfer information and personal information by personnel of the distribution center, and wherein the identity and transfer information confirming step is also performed by the personnel of the distribution center.

20. The method according to claim 13, wherein the funds distributing step includes distributing cash from personnel of the distribution center to the receiver after the personal identity of the receiver has been confirmed.

21. An electronic funds transfer system for transferring funds from a sender to a receiver by utilizing an independent host system, the electronic funds transfer system comprising:

a transfer card unique to the sender that is capable of being read electronically or manually by the independent host system, said transfer card associated with personal information about the sender;

a central processing center operably connected to the independent host system such that transfer information from the sender can be transferred to the central processing center via the independent host system; and a distribution center operably connected to the central processing center, said distribution center operable to receive transfer information from the central processing center and to receive personal identification and transfer information from the receiver in order to effect the transfer of funds.

22. The system according to claim 21, wherein the transfer card includes at least one device selected from the group consisting of a magnetic stripe and a bar code, the at least one device associated with the personal information about the sender.

23. The system according to claim 21, wherein the at least one device of the transfer card further is associated with personal information about the receiver.

24. The system according to claim 21, wherein the central processing center includes an information database and an authorization component, the information database being capable of storing information at least about the sender, the authorization component being capable of authorizing funds transfers that meet predetermined guidelines.

25. The system according to claim 21, wherein the distribution center includes personnel and is a financial institution.

26. The system according to claim 25, wherein the distribution center personnel are capable of confirming the personal identity of the receiver and distributing the transferred funds thereafter.

27. The system according to claim 21, wherein the central processing center is capable of calculating currency exchange rates so that the funds sent from the sender and subsequently received by the receiver are equal but of different currencies.

28. A method of utilizing an existing third party point-of-sale device for transferring funds between a sender and a receiver, the method comprising:

receiving transfer information that includes personal information at least about the sender, the transfer information being associated with a transfer card readable by the existing third party point-of-sale device;

transferring cash from the sender to the third party;

sending transfer information from the third party to a central processing center that includes a transaction code;

receiving personal identification and the transaction code from the receiver by personnel of a distribution center; and distributing funds from the distribution center to the receiver in an amount to be transferred.

29. The method according to claim 28, further comprising confirming the personal identification of the receiver by personnel of the distribution center.

30. The method according to claim 28, wherein the transfer information receiving step includes scanning a bar code on the transfer card by the third parry point-of-sale device.

31. The method according to claim 30, wherein the bar code is scanned in conjunction with a purchase of unrelated goods and/or services.

32. The method according to claim 28, wherein the transfer information receiving step includes swiping a magnetic stripe through a magnetic stripe reader of the third party point-of-sale device.

33. The method according to claim 32, wherein the magnetic stripe is swiped in conjunction with a purchase of unrelated goods and/or services.

34. The method according to claim 28, further comprising printing a receipt that includes at least the transaction code and an amount to be transferred.

* * * * *